US012573619B2

(12) United States Patent
Ohsawa et al.

(10) Patent No.: US 12,573,619 B2
(45) Date of Patent: Mar. 10, 2026

(54) ELECTRODE AND BATTERY

(71) Applicant: TOYOTA JIDOSHA KABUSHIKI KAISHA, Toyota (JP)

(72) Inventors: Ryosuke Ohsawa, Okazaki (JP); Masashi Ueda, Toyota (JP); Takuo Yanagi, Toyota (JP); Sokichi Okubo, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/443,442

(22) Filed: Feb. 16, 2024

(65) Prior Publication Data

US 2024/0250245 A1     Jul. 25, 2024

Related U.S. Application Data

(63) Continuation of application No. 18/061,067, filed on Dec. 2, 2022.

(30) Foreign Application Priority Data

Jan. 13, 2022     (JP) ................................. 2022-003630

(51) Int. Cl.
*H01M 4/36* (2006.01)
*H01M 4/131* (2010.01)
(Continued)

(52) U.S. Cl.
CPC ........... *H01M 4/366* (2013.01); *H01M 4/131* (2013.01); *H01M 4/505* (2013.01); *H01M 4/525* (2013.01);
(Continued)

(58) Field of Classification Search
CPC ...... H01M 4/366; H01M 4/131; H01M 4/505; H01M 4/525; H01M 4/625; H01M 10/0525; H01M 2004/028
See application file for complete search history.

(56) References Cited

U.S. PATENT DOCUMENTS

| | | | |
|---|---|---|---|
| 2020/0006767 A1* | 1/2020 | Du ........................ | H01M 4/525 |
| 2023/0042151 A1* | 2/2023 | Yue ................... | H01M 10/0525 |
| 2023/0223520 A1 | 7/2023 | Ohsawa et al. | |

FOREIGN PATENT DOCUMENTS

| | | | | |
|---|---|---|---|---|
| CN | 110660961 A | * | 1/2020 | ........ H01M 10/0525 |
| CN | 112151793 A | * | 12/2020 | ............ H01M 4/131 |

(Continued)

OTHER PUBLICATIONS

Ryosuke OHSAWA et al., U.S. Appl. No. 18/061,067, filed Dec. 2, 2022.

(Continued)

*Primary Examiner* — Keith Walker
*Assistant Examiner* — Steven S Ha
(74) *Attorney, Agent, or Firm* — Dickinson Wright, PLLC

(57) ABSTRACT

In this disclosure, a battery is provided. The electrode includes an electrode current collector and an electrode active material layer, wherein the electrode active material layer includes a single crystal electrode active material and a polycrystalline electrode active material, and the single crystal electrode active material and the polycrystalline electrode active material are each a lithium transition metal composite oxide, and the electrode active material layer includes a first layer including a first surface opposite to the electrode current collector and a second layer including a second surface on the electrode current collector side, wherein the first layer includes the single crystal electrode active material as a main component of the electrode active (Continued)

material, and the second layer includes the polycrystalline electrode active material as a main component of the electrode active material.

5 Claims, 1 Drawing Sheet

(51) Int. Cl.

| | |
|---|---|
| *H01M 4/505* | (2010.01) |
| *H01M 4/525* | (2010.01) |
| *H01M 4/62* | (2006.01) |
| *H01M 10/0525* | (2010.01) |
| *H01M 4/02* | (2006.01) |

(52) U.S. Cl.
CPC ....... *H01M 4/625* (2013.01); *H01M 10/0525* (2013.01); *H01M 2004/028* (2013.01)

(56) References Cited

FOREIGN PATENT DOCUMENTS

| | | | | | |
|---|---|---|---|---|---|
| JP | 2006054159 | A | 2/2006 | | |
| JP | 2012084255 | A | 4/2012 | | |
| JP | 2021507486 | A | 2/2021 | | |
| JP | 2023102892 | A | 7/2023 | | |
| WO | 2019123306 | A1 | 6/2019 | | |
| WO | WO-2021189455 | A1 * | 9/2021 | ............ | H01M 4/525 |

OTHER PUBLICATIONS

Office Action issued to U.S. Appl. No. 18/061,067 on Jun. 13, 2025.
Ryosuke Ohsawa et al., U.S. Appl. No. 18/061,067, Final Office Action dated Dec. 22, 2025.

* cited by examiner

ELECTRODE AND BATTERY

CROSS-REFERENCE TO RELATED APPLICATION

This application is a continuation of U.S. patent application Ser. No. 18/061,067, filed Dec. 2, 2022, which claims priority to Japanese Patent Application No. 2022-003630 filed on Jan. 13, 2022, incorporated herein by reference in its entirety.

BACKGROUND

1. Technical Field

The present disclosure relates to electrodes and batteries.

2. Description of Related Art

In recent years, with the rapid spread of electronic devices such as personal computers and mobile phones, a battery used as a power source thereof has been developed. In the automotive industry, batteries used in hybrid electric vehicles (HEVs), plug-in hybrid electric vehicles (PHEV), and battery electric vehicles (BEVs) have been developed. Among various batteries, a lithium ion secondary battery has an advantage of high energy density.

A battery represented by a lithium ion secondary battery usually includes a positive electrode, a negative electrode, and an electrolyte layer disposed between the positive electrode and the negative electrode. The positive electrode usually includes a positive electrode current collector and a positive electrode active material layer containing a positive electrode active material. The negative electrode usually includes a negative electrode current collector and a negative electrode active material layer containing a negative electrode active material.

For example, Japanese Unexamined Patent Application Publication No. 2006-054159 (JP 2006-054159 A) discloses a positive electrode active material for a non-aqueous secondary battery in which nickel and lithium are main components and that is configured of primary particles in which an average particle diameter is 2 to 8 μm in a single crystal. Japanese Unexamined Patent Application Publication (Translation of PCT Application) No. 2012-507486 (JP 2012-507486 A) discloses a method for preparing a powdery positive electrode active material including a first compound powder containing polycrystalline particles and a second compound powder containing single crystal monolithic particles. Japanese Unexamined Patent Application Publication No. 2012-084255 (JP 2012-084255 A) discloses that a separator includes polycrystalline particles in which primary particles of a single crystal are connected, as a heat-resistant material.

SUMMARY

For example, when a single crystal electrode active material is used as in JP 2006-054159 A, the resistance of the electrode active material layer tends to increase. On the other hand, for example, in JP 2021-507486 A, when a single crystal electrode active material and a polycrystalline electrode active material are mixed and used, a current is concentrated on the polycrystalline electrode active material having low resistance, and cycle characteristics tend to deteriorate.

The present disclosure has been made in view of the above circumstances, and it is a main object of the present disclosure to provide an electrode that achieves both resistance reduction and cycle characteristics improvement.

In the present disclosure, provided is an electrode used in a battery, the electrode including: an electrode current collector; and an electrode active material layer, in which the electrode active material layer contains a single crystal electrode active material and a polycrystalline electrode active material as electrode active materials, in which the single crystal electrode active material and the polycrystalline electrode active material are lithium transition metal composite oxides, in which the electrode active material layer includes a first layer including a first surface on an opposite side from the electrode current collector, and a second layer including a second surface on the electrode current collector side, in which the first layer contains the single crystal electrode active material as a main component of the electrode active material, and in which the second layer contains the polycrystalline electrode active material as a main component of the electrode active material.

According to the present disclosure, by using the single crystal electrode active material for the first layer, and by using the polycrystalline electrode active material for the second layer, the electrode achieves both reduction in resistance and improvement in cycle characteristics.

In the disclosure described above, each of the single crystal electrode active material and the polycrystalline electrode active material may contain at least one of Ni, Co, and Mn as a transition metal.

In the disclosure described above, a constituent element constituting the single crystal electrode active material and a constituent element constituting the polycrystalline electrode active material may be the same.

In the above disclosure, the first layer may contain the polycrystalline electrode active material.

In the above disclosure, the first layer may not contain the polycrystalline electrode active material.

In the above disclosure, the second layer may contain the single crystal electrode active material.

In the above disclosure, the second layer may not contain the single crystal electrode active material.

In the disclosure, the first layer may contain a first composite in which a fibrous carbon material is adhered to a surface of the single crystal electrode active material, and the second layer may contain a second composite in which a particulate carbon material is adhered to a surface of the polycrystalline electrode active material.

In the disclosure, the fibrous carbon material may be a carbon nanotube and the particulate carbon material may be carbon black.

In the disclosure, the electrode may be a positive electrode.

Further, in the present disclosure, provided is a battery that includes: a positive electrode; a negative electrode; and an electrolyte layer disposed between the positive electrode and the negative electrode, in which at least one of the positive electrode and the negative electrode is the electrode described above.

According to the present disclosure, since at least one of the positive electrode and the negative electrode is the electrode described above, the battery achieves both reduction in resistance and improvement in cycle characteristics.

The electrode according to the present disclosure has an effect of achieving both reduction in resistance and improvement in cycle characteristics.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Figures 1, 2, 3, 4:
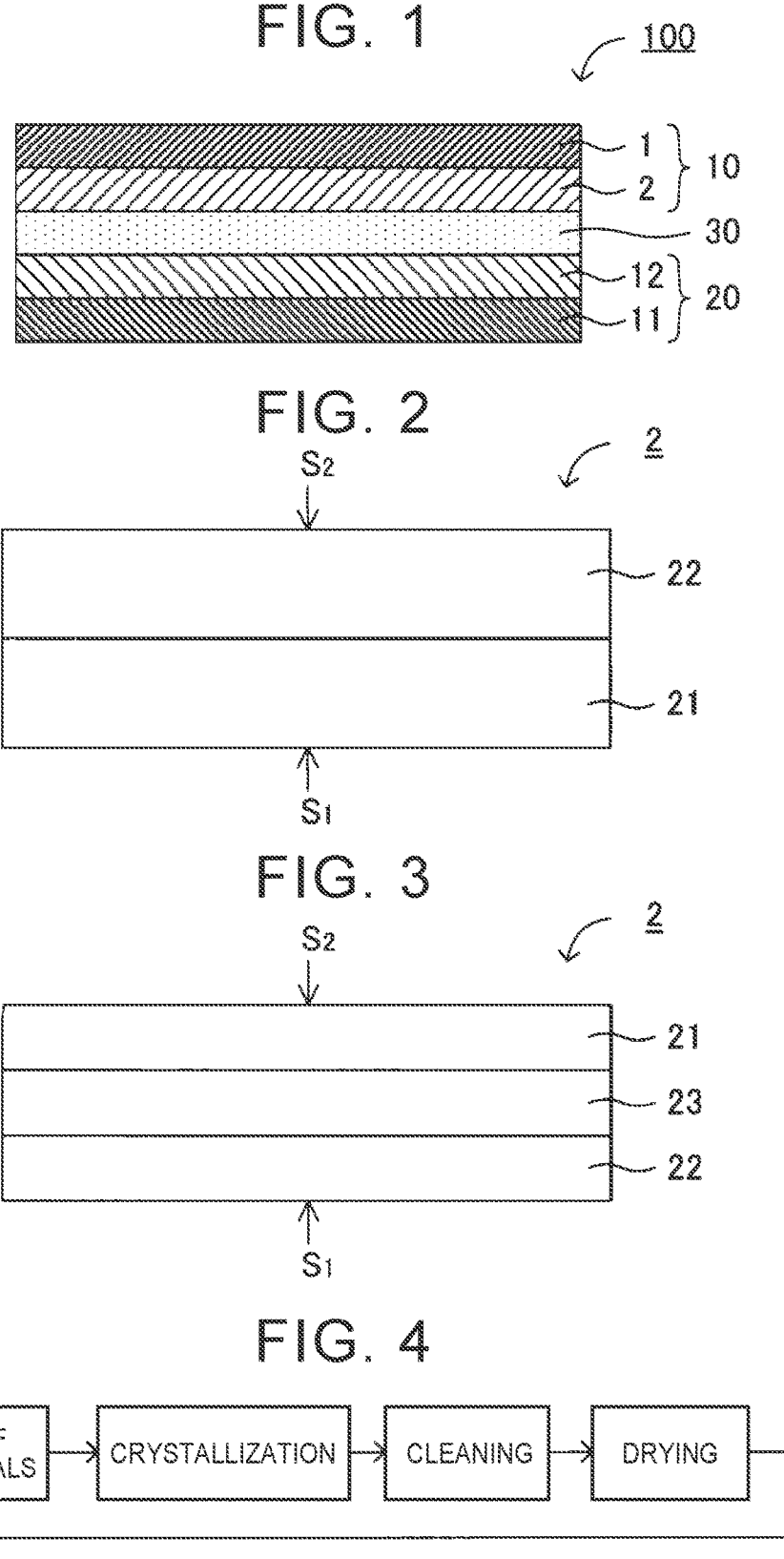
FIG. 1 is a schematic cross-sectional view illustrating a battery in the present disclosure.
FIG. 2 is an explanatory view for explaining the electrode active material layer in the present disclosure.
FIG. 3 is an explanatory view for explaining the electrode active material layer in the present disclosure.
FIG. 4 is a flow chart showing a method for synthesizing a positive electrode active material in a synthesis example.

Hereinafter, an electrode and a battery in the present disclosure will be described in detail. In the present specification, the expression "above" in describing a mode in which another member is disposed with respect to a certain member includes both a case in which another member is disposed directly above the certain member so as to be in contact with the certain member and a case in which another member is disposed above the certain member via another member, unless otherwise specified.

A. Electrode

The electrode in the present disclosure is used for a battery. FIG. 1 is a schematic cross-sectional view illustrating a battery in the present disclosure. The battery 100 illustrated in FIG. 1 includes a positive electrode 10, a negative electrode 20, and an electrolyte layer 30 disposed between the positive electrode 10 and the negative electrode 20. The positive electrode 10 includes a positive electrode current collector 1 and a positive electrode active material layer 2 disposed between the positive electrode current collector 1 and the electrolyte layer 30. On the other hand, the negative electrode 20 includes a negative electrode current collector 11 and a negative electrode active material layer 12 disposed between the negative electrode current collector 11 and the electrolyte layer 30. The electrode in the present disclosure may be a positive electrode, a negative electrode, or both a positive electrode and a negative electrode.

FIG. 2 is an explanatory diagram illustrating an electrode active material layer in the present disclosure. FIG. 2 illustrates a case where the electrode active material layer is a positive electrode active material layer. The positive electrode active material layer 2 contains, as a positive electrode active material, a single crystal electrode active material and a polycrystalline electrode active material. These definitions will be described later. Each of the single crystal electrode active material and the polycrystalline electrode active material is a lithium transition metal composite oxide.

As shown in FIG. 2, the positive electrode active material layer 2 includes a first layer 21 including a first surface $S_1$ on the other side of the positive electrode current collector (not shown), and a second layer 22 including a second surface $S_2$ on the positive electrode current collector (not shown). As shown in FIG. 3, the positive electrode active material layer 2 may or may not include one or two or more intermediate layers 23 between the first layer 21 and the second layer 22. The first layer 21 contains a single-crystal positive electrode active material as a main component of the positive electrode active material. On the other hand, the second layer 22 contains a polycrystalline positive electrode active material as a main component of the positive electrode active material.

According to the present disclosure, a single crystal electrode active material is used for the first layer, and a polycrystalline electrode active material is used for the second layer, so that the electrode achieves both reduction in resistance and improvement in cycle characteristics. As described above, when a single crystal electrode active material is used, the resistance of the electrode active material layer tends to increase. This is because the crystallite diameter in the single crystal electrode active material is usually larger than the crystallite diameter in the polycrystalline electrode active material. Specifically, the larger the crystallite diameter, the larger the influence of the inside of the particles in which the electrode reaction is less likely to occur, and thus the resistance tends to increase. In addition, as described above, when the single crystal electrode active material and the polycrystalline electrode active material are mixed and used, current is concentrated on the polycrystalline electrode active material having low resistance, and local deterioration is likely to occur. Therefore, the cycle characteristics tend to deteriorate.

On the other hand, in the present disclosure, a single crystal electrode active material is used for the first layer and a polycrystalline electrode active material is used for the second layer. In the first layer, for example, since the first layer reacts with more Li that has migrated from the electrolyte layer during charging, a single crystal electrode active material having lower reactivity (higher stability) is used. As a result, the cycle characteristics are improved. On the other hand, in the second layer, for example, a polycrystalline electrode active material having a lower resistance is used because the migration distance of Li during charging is long and the resistance tends to increase. As described above, in consideration of the stability against Li and the migration distance of Li, by using a single crystal electrode active material in the first layer and using a polycrystalline electrode active material in the second layer, it is possible to achieve both reduction in resistance and improvement in cycle characteristics.

1. Electrode Active Material Layer

The electrode active material layer according to the present disclosure includes, as an electrode active material, a single crystal electrode active material and a polycrystalline electrode active material. Further, the electrode active material layer in the present disclosure includes a first layer including a first surface opposite to the electrode current collector, and a second layer including a second surface on the electrode current collector side.

(1) Electrode Active Material

The electrode active material in the present disclosure may be a positive electrode active material or a negative electrode active material. The electrode active material layer contains, as an electrode active material, a single crystal electrode active material and a polycrystalline electrode active material. The shape of the single crystal electrode active material and the polycrystalline electrode active material is usually particulate. In the present disclosure, the "single crystal electrode active material" refers to an electrode active material having a primary particle diameter of 1.5 μm or more. Among them, the primary particle diameter of the single crystal electrode active material is preferably 2.0 μm or more and 6.0 μm or less. On the other hand, in the present disclosure, the "polycrystalline electrode active material" refers to an electrode active material having a primary particle diameter of less than 1.5 μm. Among them, the primary particle diameter of the polycrystalline electrode active material is preferably 0.5 μm or more and less than 1.0 μm. The primary particle diameter refers to the diameter (longest diameter) of the primary particle, and is obtained from an image obtained by observation with a scanning electron microscope (SEM). Primary particles refer to particles corresponding to ultimate particle, as determined by the geometric morphology observed by SEMs. The unit particles are typically crystallites (single crystals). The single crystal includes not only an ideal perfect crystal but also a crystal having lattice defects. Further, the single crystal electrode active material includes a material in which a relatively small number (for example, 20 or less, 10 or less, or 5 or less) of single crystals are bonded. On the other hand, a polycrystalline electrode active material is usually one in which a large number of single crystals (for example, more than 20 and may be 100 or more) are bonded (randomly) without regularity.

The single crystal electrode active material in the present disclosure is a lithium transition metal composite oxide. That is, the single crystal electrode active material contains Li, $M^1$ ($M^1$ is one, or two or more transition-metals), and O. Examples of the transition metal $M^1$ include Ni, Co, Mn, Ti, V, Cr, Fe, Cu, and Zn. Among them, the single crystal electrode active material preferably contains at least one of Ni, Co, and Mn as the transition metal. Some of the transition metals $M^1$ may be substituted with metals (including metalloids) belonging to Groups 13 to 17 of the Periodic Table. Typical examples of metals belonging to Groups 13 to 17 of the Periodic Table include Al.

Specific examples of the single crystal electrode active material include $LiCoO_2$, $LiMnO_2$, $LiNiO_2$, $Li(Ni, Co, Mn)O_2$, $Li(Ni, Co, Al)O_2$ and the like, and $LiMn_2O_4$, and $Li(Ni_{0.5}Mn_{1.5})O_4$, $Li_4Ti_5O_{12}$, and $LiFePO_4$, $LiMnPO_4$, $LiNiPO_4$, $LiCoPO_4$ Examples thereof include a spinel-type active material such as and an olivine-type active material such as.

The polycrystalline electrode active material in the present disclosure is a lithium transition metal composite oxide. That is, the polycrystalline electrode active material contains Li, $M^2$ ($M^2$ is one, or two or more transition metals), and O. Examples of the transition-metal $M^2$ include Ni, Co, Mn, Ti, V, Cr, Fe, Cu, and Zn. Among them, the polycrystalline electrode active material preferably contains at least one of Ni, Co, and Mn as the transition metal. Some of the transition metals $M^2$ may be substituted with metals (including metalloids) belonging to Groups 13 to 17 of the Periodic Table, similar to the transition metals $M^1$ described above. Specific examples of the polycrystalline electrode active material are also the same as the specific examples of the single crystal electrode active material described above.

The constituent elements constituting the single crystal electrode active material and the constituent elements constituting the polycrystalline electrode active material are preferably the same. For example, when the single crystal electrode active material contains Li, Ni, Co, Mn, and O as constituent elements, it is preferable that the polycrystalline electrode active material also contains Li, Ni, Co, Mn, and O as constituent elements. The composition of the single crystal electrode active material and the composition of the polycrystalline electrode active material are preferably the same. For example, when the single crystal electrode active material has a composition of $LiNi_{1/3}Co_{1/3}Mn_{1/3}O_2$, polycrystalline electrode active material $LiNi_{1/3}Co_{1/3}Mn_{1/3}O_2$.

For example, when the single crystal electrode active material and the polycrystalline electrode active material each contain Li, Ni, Co, Mn, and O as constituent elements, typical peaks appear at positions of $2\theta=18.5°$ to $19.0°$ in X-ray diffraction (XRD) using CuKα rays. The half width (full width at half maximum) of the peak is defined as Hw, the Hw in the single crystal electrode active material is defined as Hw1, and the Hw in the polycrystalline electrode active material is defined as Hw2. Hw1 is usually smaller than Hw2. Hw1 may be, for example, 0.8° or less. On the other hand, Hw2 may be greater than 0.8°, for example.

(2) Layer 1

The first layer in the present disclosure is a layer including a first surface on a side opposite to the electrode current collector in the electrode active material layer. The first surface is usually a surface of the electrode active material layer on the electrolyte layer side. The first layer contains a single crystal electrode active material as a main component of the electrode active material.

The first layer may contain only one type of single crystal electrode active material or two or more types thereof. The ratio of the single crystal electrode active material to all the electrode active materials included in the first layer may be, for example, more than 50% by weight, 70% by weight or more, 90% by weight or more, or 100% by weight.

The first layer may or may not contain a polycrystalline electrode active material. In the former case, the ratio of the polycrystalline electrode active material to all the electrode active materials included in the first layer may be, for example, 1 wt % or more and less than 50 wt %, and may be 5 wt % or more and 40 wt % or less.

The proportion of the electrode active material layer in the first layer is not particularly limited, but may be, for example, 40 wt % or more, 60 wt % or more, or 80 wt % or more.

The first layer may further contain a conductive material. Examples of the conductive material include a carbon material. Examples of the carbon material include particulate carbon materials such as carbon black, carbon fibers, carbon nanotubes (CNTs), and fibrous carbon materials such as carbon nanofibers (CNFs). Examples of the carbon black include acetylene black (AB), Ketjen black (KB), and furnace black (FB). The first layer may further contain a binder. Examples of the binder include fluorine-containing binders such as polyvinylidene fluoride (PVDF) and polytetrafluoroethylene (PTFE). The first layer usually contains an electrolyte to be described later.

The first layer preferably contains a fibrous carbon material as a main component of the conductive material. This is because the fibrous carbon material usually has a larger specific surface area than the particulate carbon material, and the contact with the single crystal electrode active material is favorable. The single crystal electrode active material usually has less surface irregularities than the polycrystalline electrode active material, and therefore is less likely to come into good contact with the carbon material. On the other hand, by using a fibrous carbon material having a large specific surface area, contact between the fibrous carbon material and the single crystal electrode active material becomes good, and resistance tends to decrease. The ratio of the fibrous carbon material to all the conductive materials included in the first layer may be, for example, more than 50% by weight, 70% by weight or more, 90% by weight or more, or 100% by weight.

The first layer preferably contains a first composite in which a fibrous carbon material is adhered to the surface of a single crystal electrode active material. This is because the contact between the fibrous carbon material and the single crystal electrode active material is further improved. As a method for producing the first composite, a method of compounding a fibrous carbon material and a single crystal electrode active material using a composite treatment apparatus is exemplified. In the first composite, the fibrous carbon material is attached to the surface of the single crystal electrode active material in a dispersed state. The proportion of the fibrous carbon material in the first composite may be, for example, 0.5 wt % or more and 5 wt % or less, and may be 1 wt % or more and 3 wt % or less. In addition, the first composite may further contain the binder described above.

The thickness of the first layer is, for example, 1 μm or more and 500 μm or less, may be 5 μm or more and 250 μm or less, and may be 15 μm or more and 150 μm or less.

(3) Second Layer

The second layer in the present disclosure is a layer including a second surface on the electrode current collector side in the electrode active material layer. The second layer contains a polycrystalline electrode active material as a main component of the electrode active material.

The second layer may contain only one type of polycrystalline electrode active material or two or more types of polycrystalline electrode active materials. The ratio of the polycrystalline electrode active material to all the electrode active materials included in the second layer may be, for example, more than 50% by weight, 70% by weight or more, 90% by weight or more, or 100% by weight.

The second layer may or may not contain a single crystal electrode active material. In the former case, the ratio of the single crystal electrode active material to all the electrode active materials included in the second layer may be, for example, 1 wt % or more and less than 50 wt %, and may be 5 wt % or more and 40 wt % or less.

The proportion of the electrode active material layer in the second layer is not particularly limited, but may be, for example, 40 wt % or more, 60 wt % or more, or 80 wt % or more.

The second layer may further contain the conductive material described above. Similarly, the second layer may further contain the binder described above. The second layer usually contains an electrolyte to be described later.

The second layer preferably contains a particulate carbon material as a main component of the conductive material. This is because particulate carbon materials are typically less expensive than fibrous carbon materials. The polycrystalline electrode active material usually has more surface irregularities than the single crystal electrode active material. Therefore, even when a particulate carbon material having a small specific surface area is used, the contact between the polycrystalline electrode active material and the particulate carbon material becomes good. The ratio of the particulate carbon material to all the conductive materials included in the second layer may be, for example, more than 50% by weight, 70% by weight or more, 90% by weight or more, or 100% by weight.

The second layer preferably contains a second composite in which a particulate carbon material is attached to the surface of the polycrystalline electrode active material. This is because the contact between the particulate carbon material and the polycrystalline electrode active material is further improved. The method for producing the second composite is the same as the method for producing the first composite described above. In the second composite, the particulate carbon material is attached to the surface of the polycrystalline electrode active material in a dispersed state. The proportion of the particulate carbon material in the second composite may be, for example, 0.5 wt % or more and 5 wt % or less, and may be 1 wt % or more and 3 wt % or less. The second composite may further contain the binder described above.

The thickness of the second layer is, for example, 1 μm or more and 500 μm or less, may be 5 μm or more and 250 μm or less, and may be 15 μm or more and 150 μm or less. The relationship between the thicknesses of the second layer and the first layer is not particularly limited, and the thickness of the second layer may be larger than the thickness of the first layer, may be the same as the thickness of the first layer, or may be smaller than the thickness of the first layer. The phrase "the thickness of the second layer and the thickness of the first layer are the same" means that the absolute value of the difference between the thicknesses of the second layer and the first layer is 3 μm or less.

(4) Electrode Active Material Layer

The electrode active material layer according to the present disclosure includes at least a first layer and a second layer. The electrode active material layer may have one layer or two or more intermediate layers between the first layer and the second layer. The intermediate layer contains an electrode active material. The intermediate layer may contain (i) only a single crystal electrode active material as an electrode active material, (ii) only a polycrystalline electrode active material, or (iii) both a single crystal electrode active material and a polycrystalline electrode active material as an electrode active material.

In the case where the electrode active material layer includes an intermediate layer, it is preferable that the weight ratio of the single crystal electrode active material in the electrode active material layer gradually decreases from the first surface toward the second surface of the electrode active material layer. That is, when the weight of all the single crystal electrode active materials contained in the electrode active material layer is 100 parts by weight, the weight of the single crystal electrode active material contained in the first layer is X parts by weight, the weight of the single crystal electrode active material contained in the intermediate layer is Y parts by weight, and the single crystal electrode active material contained in the second layer is Z parts by weight, X, Y, and Z preferably satisfy $X>0$, $Y \geq 0$, $Z \geq 0$, $X > Y \geq Z$, and $X+Y+Z=100$. Y and Z may satisfy $Y>Z$.

When the electrode active material layer includes an intermediate layer, the weight ratio of the polycrystalline electrode active material in the electrode active material layer preferably increases stepwise from the first surface toward the second surface of the electrode active material layer. That is, in the case where the weight of all the polycrystalline electrode active materials included in the electrode active material layer is 100 parts by weight, the weight of the polycrystalline electrode active material included in the first layer is P parts by weight, the weight of the polycrystalline electrode active material included in the intermediate layer is Q parts by weight, and the weight of the polycrystalline electrode active material included in the second layer is R parts by weight, P, Q, and R preferably satisfy $P \geq 0$, $Q \geq 0$, $R>0$, $P \leq Q < R$, and $P+Q+R=100$. P and Q may satisfy $P<Q$.

The intermediate layer in the electrode active material layer may further contain at least one of a conductive material and a binder in addition to the electrode active material. The details of the conductive material and the binder are the same as those described above, and thus the description thereof will be omitted. The intermediate layer usually contains an electrolyte to be described later. The thickness of the electrode active material layer is, for example, 2 μm or more and 1000 μm or less, may be 10 μm or more and 500 μm or less, and may be 30 μm or more and 300 μm or less.

2. Electrode Current Collector

The electrode current collector according to the present disclosure collects the electrode active material layer. The electrode current collector may be a positive electrode current collector or a negative electrode current collector. Examples of the material of the positive electrode current collector include SUS, aluminum, nickel, iron, titanium, and carbon. Examples of the material of the negative electrode current collector include SUS, copper, nickel, and carbon. Examples of the shape of the electrode current collector include a foil shape and a mesh shape.

B. Battery

FIG. 1 is a schematic cross-sectional view illustrating a battery in the present disclosure. The battery 100 illustrated in FIG. 1 includes a positive electrode 10, a negative electrode 20, and an electrolyte layer 30 disposed between the positive electrode 10 and the negative electrode 20. At least one of the positive electrode 10 and the negative electrode 20 corresponds to the electrode described in "A. Electrode" above.

According to the present disclosure, since at least one of the positive electrode and the negative electrode is the electrode described above, the battery achieves both reduction in resistance and improvement in cycle characteristics.

1. Positive Electrode

The positive electrode includes a positive electrode current collector and a positive electrode active material layer disposed on a surface of the positive electrode current collector on the electrolyte layer side. The positive electrode in the present disclosure preferably corresponds to the electrode described above. On the other hand, when the positive electrode in the present disclosure does not correspond to the electrode described above, the negative electrode in the present disclosure usually corresponds to the electrode described above. In this case, any conventional positive electrode can be used as the positive electrode.

2. Negative Electrode

The negative electrode includes a negative electrode current collector and a negative electrode active material layer disposed on a surface of the negative electrode current collector on the electrolyte layer side. The negative electrode in the present disclosure preferably corresponds to the electrode described above. On the other hand, when the negative electrode in the present disclosure does not correspond to the electrode described above, the positive electrode in the present disclosure usually corresponds to the electrode described above. In this case, any conventional negative electrode can be used as the negative electrode.

3. Electrolyte Layer

The electrolyte layer according to the present disclosure contains at least an electrolyte. Examples of the electrolyte include a liquid electrolyte (electrolyte solution), a gel electrolyte, and a solid electrolyte.

The electrolytic solution includes, for example, a lithium salt and a solvent. As a lithium salt, for example, $LiPF_6$, $LiBF_4$, $LiClO_4$, $LiAsF_6$ and the like, inorganic lithium salt; $LiCF_3SO_3$, $LiN(SO_2CF_3)_2 LiN(SO_2C_2F_5)_2$, $LiC(SO_2CF_3)_3$, and the like. Examples of the solvent include ethylene carbonate (EC), propylene carbonate (PC), butylene carbonate (BC), dimethyl carbonate (DMC), diethyl carbonate (DEC), and ethyl methyl carbonate (EMC). The solvent may be one kind or two or more kinds.

The gel electrolyte is usually obtained by adding a polymer to an electrolyte solution. Examples of the polymer include polyethylene oxide and polypropylene oxide. Examples of the solid electrolyte include an organic solid electrolyte such as a polymer electrolyte; and an inorganic solid electrolyte such as a sulfide solid electrolyte and an oxide solid electrolyte. The thickness of the electrolyte layer is, for example, 0.1 μm or more and 1000 μm or less. The electrolyte layer may include a separator.

4. Battery

The battery in the present disclosure is typically a lithium-ion secondary battery. Applications of batteries include, for example, power supplies for vehicles such as hybrid electric vehicles (HEVs), plug-in hybrid electric vehicles (PHEV), battery electric vehicles (BEVs), gasoline vehicles, diesel vehicles, and the like. Further, the battery in the present disclosure may be used as a power source for a moving object (for example, a railway, a ship, or an aircraft) other than a vehicle, or may be used as a power source for an electric product such as an information processing apparatus.

The present disclosure is not limited to the above-described embodiments. The above-described embodiment is an example, and any one having substantially the same configuration as the technical idea described in the claims in the present disclosure and having the same operation and effect is included in the technical scope of the present disclosure.

Synthesis Example 1

A polycrystalline positive electrode active material was synthesized according to the synthesis flow shown in FIG. 4. First, as a raw material, $NiSO_4$, $CoSO_4$, $MnSO_4$, were prepared, and these were weighed in a molar ratio of $NiSO_4:CoSO_4:MnSO_4=1:1:1$, dissolved in ion-exchanged water so as to have a concentration of 30 wt %, to obtain a raw material solution (raw material dissolution). Next, a fixed amount of $NH_3$ aqueous solution was placed in the reactor, nitrogen was replaced with stirrer, and NaOH was added to adjust the pH to alkaline. The raw material solution and the $NH_3$ aqueous solution were added dropwise to precipitate the transition-metal hydroxide (crystallization) while controlling the inside of the reactor to a constant pH.

The precipitated transition metal hydroxide was then removed by filtration and then washed with an aqueous solution of carboxymethylcellulose (CMC solution) (washing). The washed transition metal hydroxide was then removed by filtration and dried at 120° C. for 16 hours (drying). Next, the dried transition-metal hydroxide and the Li feedstock ($Li_2CO_3$) were mixed in a mortar (Li feedstock mixing). The resulting mixture was then calcined using a muffle furnace at 800° C. to 950° C. for 10 hours. Next, the obtained calcined product was crushed using a jet mill to obtain a positive electrode active material ($LiNi_{1/3}Co_{1/3}Mn_{1/3}O_2$). When the obtained positive electrode active material was observed with a scanning electron microscope (SEM), it was confirmed that the positive electrode active material corresponds to a polycrystalline positive electrode active material.

Synthesis Example 2

Except that the firing temperature was changed to 950° C. to 1100° C., the same procedure as in Synthesis Example 1, the positive electrode active material ($LiNi_{1/3}Co_{1/3}Mn_{1/3}O_2$) was obtained. When the obtained positive electrode active material was observed with a scanning electron microscope (SEM), it was confirmed that the positive electrode active material corresponds to a single crystal type positive electrode active material.

Example 1

A battery was fabricated using the polycrystalline positive electrode active material obtained in Synthesis Example 1 and the single crystal positive electrode active material obtained in Synthesis Example 2. A method of manufacturing the battery is as follows. First, a single-crystal positive electrode active material, a conductive material (acetylene black), and a binder (polyvinylidene fluoride) were weighed in a weight ratio of a single-crystal positive electrode active material:conductive material:binder=88:10:2, and mixed. A dispersion medium was added to the obtained mixture and stirred to obtain a positive electrode slurry for the first layer.

Next, a polycrystalline positive electrode active material, a conductive material (acetylene black), and a binder (polyvinylidene fluoride) were weighed in a weight ratio of polycrystalline positive electrode active material:conductive material:binder=88:10:2, and mixed. A dispersion medium was added to the obtained mixture and stirred to obtain a positive electrode slurry for the second layer.

Next, the positive electrode slurry for the second layer and the positive electrode slurry for the first layer were continuously applied onto the positive electrode current collector (Al foil) using a film applicator (film thickness adjusting function, all-good Corporation), and dried at 80° C. for 5 minutes. Thus, a positive electrode structure including a positive electrode current collector, a second layer, and a first layer was obtained. When all the positive electrode active materials contained in the positive electrode active material layer were 100 parts by weight, the single crystal positive electrode active material contained in the first layer was 20 parts by weight, the polycrystalline positive electrode active material contained in the first layer was 0 parts by weight, the single crystal positive electrode active material contained in the second layer was 0 parts by weight, and the polycrystalline positive electrode active material contained in the second layer was 80 parts by weight. The ratio of the active material in the positive electrode active material layer was adjusted by the amount of slurry applied in the preparation of the first layer and the second layer.

Next, a negative electrode active material (natural graphite) and a binder (SBR and CMC) were mixed, a dispersion medium was added to the obtained mixture, and the mixture was stirred to obtain a negative electrode slurry. The obtained negative electrode slurry was coated on a negative electrode current collector with a film applicator, and then dried at 80° C. for 5 minutes. Thus, a negative electrode structure having a negative electrode current collector and a negative electrode layer was obtained.

The positive electrode layer in the positive electrode structure and the negative electrode layer in the negative electrode structure were opposed to each other via a separator, wound, and injected with an electrolytic solution to obtain a battery. As the electrolytic solution, EC, DMC and EMC were dissolved in a mixed solvent in a volume ratio of EC:DMC:EMC=3:4:3 so that $LiPF_6$ was 1 M.

Example 2, 3

A battery was obtained in the same manner as in Example 1, except that the ratio of the active material in the positive electrode active material layer was changed to the value shown in Table 1.

Example 4

First, a single-crystal positive electrode active material, a polycrystalline positive electrode active material, a conductive material (acetylene black) and a binder (polyvinylidene fluoride) were weighed at a weight ratio of a single-crystal positive electrode active material:polycrystalline positive electrode active material:conductive material:binder=52.8:35.2:10:2, and mixed. A dispersion medium was added to the obtained mixture and stirred to obtain a positive electrode slurry for the first layer.

Next, a single-crystal positive electrode active material, a polycrystalline positive electrode active material, a conductive material (acetylene black) and a binder (polyvinylidene fluoride) were weighed at a weight ratio of a single-crystal positive electrode active material:polycrystalline positive electrode active material:conductive material:binder=35.2:52.8:10:2, and these were mixed. A dispersion medium was added to the obtained mixture and stirred to obtain a positive electrode slurry for the second layer.

A battery was obtained in the same manner as in Example 2, except that the obtained positive electrode slurry for the first layer and the obtained positive electrode slurry for the second layer were used.

Comparative Example 1

A battery was obtained in the same manner as in Example 2, except that the positive electrode slurry for the first layer was used instead of the positive electrode slurry for the second layer.

Comparative Example 2

A battery was obtained in the same manner as in Example 2, except that the positive electrode slurry for the second layer was used instead of the positive electrode slurry for the first layer.

Comparative Example 3

A battery was obtained in the same manner as in Example 3, except that the positive electrode slurry for the second layer was used instead of the positive electrode slurry for the first layer and the positive electrode slurry for the first layer was used instead of the positive electrode slurry for the second layer.

Comparative Example 4

A single-crystal positive electrode active material, a polycrystalline positive electrode active material, a conductive material (acetylene black), and a binder (polyvinylidene fluoride) were weighed in a weight ratio of a single-crystal positive electrode active material:polycrystalline positive electrode active material:conductive material:binder=44:44:10:2, and mixed. A dispersion medium was added to the obtained mixture and stirred to obtain a positive electrode slurry for the first layer. The same procedure was carried out to obtain a positive electrode slurry for the second layer.

A battery was obtained in the same manner as in Example 2, except that the obtained positive electrode slurry for the first layer and the obtained positive electrode slurry for the second layer were used.

Evaluation

Initial Resistance

The batteries obtained in Examples 1-4 and Comparative Examples 1-4 were charged to 4.1V and then discharged to 3.0V. Thereafter, the battery was charged to 3.7V and allowed to stand at 60° C. for 9 hours. The charge resistance was then measured at −10° C. for 10 seconds at 3.7V 1 C to determine the initial resistance. The results are shown in Table 1. Note that the initial resistance in Table 1 is a relative value when Comparative Example 1 is set to 100%.

(Capacity Retention Rate)

The batteries obtained in Examples 1 to 4 and Comparative Examples 1 to 4 were charged and discharged at a 4.1V to 3.0V, 2 C of 60° C. for 200 cycles. The capacity retention ratio was obtained by dividing the charge capacity at 200 cycles by the charge capacity at the first cycle. The results are shown in Table 1.

material:binder=97.5:1.5: were weighed at a rate of 1, these multi-purpose small mixed pulverizer (MP mixer, manufactured by Nippon Coke Industry Co., Ltd.) was charged to 10,000 rpm, mixed under the conditions of 10 minutes, to produce a second composite.

The first composite and the second composite were then mixed in a mortar for 5 minutes. The resulting mixture was deposited on a positive electrode current collector (Al foil, thickness 12 μm) using an electrostatic screen deposition apparatus (manufactured by Belk Industry Co., Ltd.). Thus, a positive electrode precursor having a positive electrode current collector and a powder layer was produced. In the preparation conditions, the distance between the positive electrode current collector and the electrostatic screen was 1 cm, and a voltage of 1.5 kV was applied at the time of film formation. Then, the positive electrode precursor was sandwiched between two plates heated to 160° C., and a load of 15 tons was applied for 30 seconds to soften or melt the binder. Thus, the powder layer was fixed on the positive electrode current collector to obtain a positive electrode for evaluation.

TABLE 1

| | Active Material Ratio (Weight Portion) | | | | Capacity |
| | First Layer | | Second Layer | | Initial | Retention |
| | Single Crystal | Polycrystalline | Single Crystal | Polycrystalline | Resistance (%) | Ratio (%) |
|---|---|---|---|---|---|---|
| Comparative Example 1 | 50 | 0 | 50 | 0 | 100 | 90 |
| Comparative Example 2 | 0 | 50 | 0 | 50 | 90 | 70 |
| Comparative Example 3 | 0 | 80 | 20 | 0 | 93 | 67 |
| Example 4 | 25 | 25 | 25 | 25 | 95 | 63 |
| Example 1 | 20 | 0 | 0 | 80 | 92 | 85 |
| Example 2 | 50 | 0 | 0 | 50 | 94 | 88 |
| Example 3 | 80 | 0 | 0 | 20 | 96 | 89 |
| Example 4 | 30 | 20 | 20 | 30 | 95 | 88 |

As shown in Table 1, Examples 1 to 4 had lower initial resistance and similar capacity retention rates as compared with Comparative Example 1. On the other hand, in Comparative Examples 2 to 4, although the initial resistance was lower than that in Comparative Example 1, the capacity retention ratio was significantly decreased. As described above, in the present disclosure, it was confirmed that both reduction in resistance and improvement in cycle characteristics can be achieved.

Reference Example 1

A single-crystal positive electrode active material prepared in Synthesis Example 2, a conductive material (acetylene black, AB), and a binder (polyvinylidene fluoride) were weighed in a weight ratio of a single-crystal positive electrode active material:conductive material:binder=97.5:1.5:1, and these were charged into a multi-purpose small mixing and pulverizing machine (MP mixer, manufactured by Nippon Coke Industry Co., Ltd.), and combined under conditions of 10,000 rpm and 10 minutes to prepare a first composite.

Next, the positive electrode active material of the polycrystalline system prepared in Synthesis Example 1, a conductive material (acetylene black), and a binder (polyvinylidene fluoride), by weight ratio, the positive electrode active material of the polycrystalline system:conductive Reference Example 2

An evaluation positive electrode was obtained in the same manner as in Reference Example 1, except that the conductive material in the first composite was changed from acetylene black (AB) to carbon nanotube (CNT). The first composite prepared in Reference Example 2 (using CNT) and the first composite prepared in Reference Example 1 (using AB) were observed by SEM. As a result, it was confirmed that the adhesion amount of CNTs adhering to the surface of the positive electrode active material of the single crystal system was larger than the adhesion amount of ABs adhering to the surface of the positive electrode active material of the single crystal system.

Evaluation (Electron Resistance)

Electronic resistance of the positive electrode for evaluation obtained in Reference Examples 1 and 2 was measured using an electrode resistance measuring system (RM2610 manufactured by HIOKI). The test results are shown in Table 2. Note that the electronic resistance in Table 2 is a relative value when the reference example 1 is set to 100%.

(Cell Resistance)

A small cell was manufactured using the evaluation positive electrodes obtained in Reference Examples 1 and 2, and IV measurement was performed. Specifically, the current I of 0.3 C, 0.5 C and the current I of 1 C were discharged for 10 seconds, and the voltage drop ΔV was measured. The resistance (slope) was calculated from the relationship between the current I and ΔV. The test results are shown in Table 2. Note that the cell resistance in Table 2 is a relative value when Reference Example 1 is set to 100%.

TABLE 2

|  | Mixture Layer Resistance (%) | Cell Resistance (%) |
|---|---|---|
| Reference Example 1 | 100 | 100 |
| Reference Example 2 | 16.7 | 80.0 |

As shown in Table 2, the electronic resistance and the cell resistance of Reference Example 2 were lower than those of Reference Example 1. This is considered to be because the adhesion amount of the conductive material (CNT) in Reference Example 2 is larger than the adhesion amount of the conductive material (CNT) in Reference Example 1, and the electron conductivity of the first composite in Reference Example 2 is higher than the electron conductivity of the first composite in Reference Example 1.

What is claimed is:

1. A positive electrode that is used in a battery, the positive electrode comprising:
    a positive electrode current collector; and
    a positive electrode active material layer,
    wherein the positive electrode active material layer contains a single crystal positive electrode active material and a polycrystalline positive electrode active material as positive electrode active materials,
    wherein the single crystal positive electrode active material and the polycrystalline positive electrode active material are lithium transition metal composite oxides,
    wherein the positive electrode active material layer includes a first layer including a first surface on an opposite side from the positive electrode current collector, and a second layer including a second surface on the positive electrode current collector side, and a third layer located between the first layer and the second layer,
    wherein the first layer, the second layer, and the third layer contains the single crystal positive electrode active material and the polycrystalline electrode active material as the positive electrode active material, and
    in a case where a total weight of the single crystal electrode active material contained in the positive electrode active material layer is 100 parts by weight, and a weight of the single crystal electrode active material contained in the first layer is X parts by weight, a weight contained in the third layer is Y parts by weight, and a weight contained in the second layer is Z parts by weight, X, Y, and Z satisfy following conditions:
    X>0, Y>0, Z>0 X>Y≥Z, and X+Y+Z=100.

2. The positive electrode according to claim 1, wherein the single crystal positive electrode active material and the polycrystalline positive electrode active material each contain at least one of Ni, Co, and Mn as a transition metal.

3. The positive electrode according to claim 1, wherein a constituent element constituting the single crystal positive electrode active material and a constituent element constituting the polycrystalline positive electrode active material are the same.

4. The positive electrode according to claim 1,
    wherein the first layer contains a first composite in which a fibrous carbon material is adhered to a surface of the single crystal positive electrode active material, and
    wherein the second layer contains a second composite in which a particulate carbon material is adhered to a surface of the polycrystalline positive electrode active material.

5. The positive electrode according to claim 4, wherein the fibrous carbon material is a carbon nanotube and the particulate carbon material is carbon black.

* * * * *